3,514,267
BATCH SEPARATOR OF YTTRIUM AND RARE EARTHS UNDER TOTAL REFLUX

Leonard George Sherrington and William Palmer Kemp, Vicars Cross, Chester, England, assignors to Thorium Limited, London, England, a British company
No Drawing. Filed Feb. 2, 1967, Ser. No. 613,428
Claims priority, application Great Britain, Feb. 4, 1966, 4,952/66
Int. Cl. B01d 11/04
U.S. Cl. 23—312                                8 Claims

ABSTRACT OF THE DISCLOSURE

Yttrium is separated from an initial rare earth mixture by a two-stage method employing multi-stage counter-current liquid-liquid extraction systems operated at total reflux in each case, all solutes being returned, during processing, to that end of the system from which they were derived. Preferred pairs of solvent for the two stages are aqueous nitric acid/tertiary branched-chain carboxylic acid with 8 to 20 carbon atoms per molecule, and aqueous nitric acid/tributyl phosphate. Multi-stage counter-current liquid-liquid extraction at total reflux employing tertiary branched-chain carboxylic acids is also described.

---

This invention relates to a process for the separation of the element yttrium (or a compound thereof), from rare-earth elements found associated with it.

Yttrium is always found in nature associated with rare-earth elements, and is chemically very similar to many of these rare-earths. It is desirable to devise a separation procedure which will permit the production of high-purity yttrium compounds, since these are used, together with europium compounds, as constituents of the red phosphor used in colour television receivers.

The present invention provides a two-stage batch method for the separation of a solution containing highly pure yttrium from an initial mixture containing yttrium and rare-earth elements, which method comprises: dissolving the mixture in at least one solvent of two at least partially immiscible solvents; processing the resulting solution or solutions in counter-current in a multi-stage liquid-liquid extraction system, and returning any solutes leaving each end of the said multi-stage counter-current liquid-liquid extraction system to that end of the system from which they were derived; continuing this processing until a sufficient separation has been achieved; stopping the flow of both of the counter-currently flowing solvents; emptying those units of the multi-stage extraction system which contain a solution of an yttrium concentrate; recovering this concentrate and dissolving it in at least one solvent of a second pair of two at least partially immiscible solvents, at least one of which is different from the first pair; processing the resulting second solution or solutions of yttrium concentrate in counter-current in a multi-stage liquid-liquid extraction system, and returning any solutes leaving each end of the said second multi-stage counter-current liquid-liquid extraction system to that end of the system from which they were derived; continuing this processing until a sufficient separation has again been achieved; stopping the flow of both of the counter-currently flowing solvents; and emptying those units containing a solution of suitably pure yttrium.

In commercial practice solvents can generally be selected which give high purity yttrium salts in two such cycles, although it is within the scope of the invention to use three or more cycles. Thus, in a preferred embodiment the invention provides a two-stage batch method for the separation of a solution containing highly pure yttrium from an initial mixture containing yttrium and other rare earths, which method comprises the steps of:

(a) Multi-stage counter-current liquid-liquid extraction between (i) an aqueous mineral acid solution of rare earth ions, including yttrium,
(ii) a hydrocarbon solution containing both rare-earth ions, including yttrium, and a branched chain carboxylic acid, especially a tertiary carboxylic acid the extraction being carried out under conditions such that any solutes that leave each end of the extractor are continuously returned to that end of the extractor from which they were derived, whereby in time an equilibrium is attained in the system;

(b) Stopping the counter-current solvent flows when sufficient separation has been achieved, and emptying one or more stages of the extractor system containing yttrium together with some rare-earth impurities;

(c) Multi-stage counter-current liquid-liquid extraction between (i) a solution of nitrates, of the thus-obtained yttrium and some rare-earth impurities in tributyl phosphate,
(ii) an aqueous solution of nitrates of the thus-obtained yttrium and some rare-earth impurities, the extraction being carried out under conditions such that any solutes that leave each end of the extractor are continuously returned to that end of the extractor from which they were derived, whereby in time an equilibrium is attained in the system;

(d) Stopping the counter-current solvent flows when sufficient separation has been achieved, and emptying one or more stages of the extractor system containing a solution of suitably pure yttrium. While it is preferred that the two extraction steps be carried out in this order, the reverse order may be used if desired. An advantage of performing the extraction in the order stated is that the yttrium is recovered from the end stages of the extractor system used for the second extraction step.

In the first step of this form of the process, the mineral acid is preferably hydrochloric or nitric acid, while the branched-chain tertiary carboxylic acid may be the mixture of $C_9$, $C_{10}$ and $C_{11}$ tertiary carboxylic acids known under the Registered Trademark of "Versatic 911." This tertiary carboxylic acid may moreover be diluted with an inert organic liquid such as kerosene or xylene.

After the yttrium-rich stages have been removed from this first step they are preferably treated with a dilute mineral acid (preferably hydrochloric or nitric) so as to recover the yttrium in the aqueous phase at a concentration of 100–500 gm./litre. It is to be noted that both the organic and the aqueous phases may be subjected to this treatment. The yttrium-rich extract will also contain such elements as gadelinium and dyspresium and these may be located in both the aqueous and organic phases. These are thus extracted into this aqueous mineral acid solution.

The adjustment of the concentration of the aqueous extract entering stage (c) is important. Preferably, a concentration of not more than 160 g./l., for example from 80 to 120 g./l., of rare earths as oxides is used, which allows a clean separation of yttrium from the elements associated with it in the extract from stage (b). In this stage also the tributyl phosphate may be diluted with suitable inert organic solvents.

A feature upon which the practice of this invention depends is the utilization of the concept of operating such a conventional multi-stage liquid-liquid extraction unit at "total reflux." This concept is more fully explained in our British Pat. No. 1,026,791. As is disclosed therein almost any of the standard forms of extraction apparatus can be used, but this form of working is particularly suited to the devices known as "mixer-settlers." It will be appreciated that in operation under total reflux, the system gradually approaches equilibrium. Extraction can be stopped when substantial equilibrium has been reached, or earlier, when the desired solute has been sufficiently separated.

Since the solvent systems used in stages (a) and (c) are not the same, different methods of achieving total reflux may have to be used. In the case of stage (a) particularly useful methods are as follows. The aqueous solution leaving the extractor unit is treated with an alkali by which term is included ammonia, and the carboxylic acid, so as to yield a solution of yttrium ions dissolved in excess carboxylic acid, the inert diluent may be present during these operations. The hydrocarbon solution leaving the other end of the extractor unit is treated with an aqueous mineral acid solution thus decomposing the carboxylic acid salt in the organic phase, and transferring the rare-earth and yttrium values to the aqueous mineral acid solution. After suitable concentration, if necessary, this solution is then returned to the same end of the extractor as that from which the organic solution was derived; the hydrocarbon solution of carboxylic acid can be used to obtain reflux at the other end of the extractor system. In the case of stage (c) particularly useful methods are as follows. The aqueous solution leaving the extractor unit passes through an evaporator to concentrate it, and the concentrate thus obtained is returned to the same end of the extractor unit as that from which it was derived. The organic solution leaving the extractor unit is passed to a smaller second mixer-settler unit, and contacted therein countercurrently with a much larger flow of water; this transfers all the rare earth and yttrium values into the aqueous phase. After suitable concentration this is then returned to the extractor unit at the same end as that from which the organic solution was derived.

Other methods of achieving "total reflux," such as chemical precipitation (followed by filtration and redissolution in the other solvent), total evaporation of solvent (followed by redissolution in the other solvent), may be used; and, optionally, recycling of the solvents—which is to be clearly distinguished from the refluxing of solutes treated above—may also be used. These problems are clearly explained in our British Pat. No. 1,026,791 mentioned above.

The process of the present invention uses two separate solvent extraction steps, carried out under different conditions of solvent and extractant. Whilst yttrium, although not a lanthanide rare-earth, displays a chemistry closely similar to those of the lanthanide rare-earths, we have now surprisingly discovered that its behaviour in liquid-liquid solvent extraction systems is markedly dependent on: (a) the solvents in use, and (b) the extractant in use.

In determining whether or not two species can be separated by liquid-liquid counter-current solvent extraction, the necessary physical parameter is the separation factor. This is defined as the ratio of the partition coefficients of two species between the two solvents concerned, and is linked to the relative concentration in the extractor unit by the equation:

$$\frac{A_1/B_1}{A_n/B_n}=B^{(n-1)}$$

where:

A, B: components being separated
$A_1/B_1$: is their ratio in the first mixer-settler
$A_n/B_n$: is their ratio in the $n$th mixer-settler and
B is the separation factor. (Varteressian and Fenske, Ind. Eng. Chem., 29, 270 (1937).)

Even the use of apparently chemically similar extractant species causes marked changes in the determined value of B, as is shown in the following table. This table shows the separation factors between yttrium and the other rare-earths normally associated with it, using aqueous nitrates as one phase, and a number of organic phases. The results are calculated relative to B for yttrium being 1.0.

| Extraction | System Concentration (g./l. in aqueous phase) | Element, Relative Separation Factor |
|---|---|---|
| Organic phase, tributyl phosphate | 38.4 | Yb, 0.9; Y, 1.0; Er, 2.16; Ho, 3.02; Dy, 3.95; Nd, 4.12; Gd, 4.45; Sm, 5.55. |
|  | 54.7 | Yb, 0.9; Y, 1.0; Er, 1.75; Ho, 2.3; Dy, 2.8; Nd, 2.88; Gd, 3.3; Sm, 4.1. |
|  | 100.0 | Yb, 0.85; Y, 1.0; Er, 1.4; Nd, 1.45; Ho, 1.8; Gd, 2.1; Dy, 2.1; Sm, 2.45. |
| Aqueous phase, water | 147.0 | Yb, 0.9; Y, 1.0; Nd, 1.15; Er, 1.25; Ho, 1.65; Gd, 1.83; Dy, 1.9; Sm, 1.95. |
|  | 215.0 | Yb, 0.85; Nd, 0.85; Y, 1.0; Et, 1.05; Sm, 1.3; Gd, 1.45; Ho, 1.5; Dy, 1.65. |
|  | 283.0 | Nd, 0.55; Sm, 0.6; Yb, 0.9; Er, 1.0; Y, 1.0; Gd, 1.2; Ho, 1.4; Dy, 1.47. |
|  | [1] ca. 480 | Nd, 0.39; Sm, 0.88; Gd, 0.89; Yb, 0.93; Y, 1.0; Er, 1.15; Ho, 1.2; Dy, 1.3. |
| Iso-octanoic acid in xylene | | Nd, 0.68; Y, 1.0; Sm, 1.38; Gd, 1.38; Er, 1.93; Ho, 1.94; Dy, 1.98; Yb, 2.1. |
| "C7C20" Acid in xylene | | Nd, 0.76; Y, 1.0; Gd, 1.12; Sm, 1.24; Dy, 1.70; Ho, 1.77; Er, 1.95; Yb, 2.7. |
| Naphthenic acid 180 in Shellsol A | | Nd, 0.88; Y, 1.0; Sm, 1.58; Gd, 1.74; Dy, 2.4. |
| Naphthenic acid 230 in Shellsol A | | Nd, 0.70; Y, 1.0; Gd, 1.17; Sm, 1.26; Dy, 2.0. |
| Versatic acid "911" in Shellsol A | | Nd, 0.34; Sm, 0.68; Gd, 0.80; Y, 1.0; Dy, 1.87; Ho, 2.11; Er, 2.90; Yd, 3.7. |
| Versatic acid in Shellsol A | 15/19 | Pr, 0.27; Nd, 0.36; Sm, 0.61; Gd, 0.75; Y, 1.0; Yb, 1.18; Dy, 1.30; Ho, 1.96; Er, 2.50; Yb, 2.51. |

[1] Saturated aqueous solution.

The aqueous phase in every case was a solution of nitrates. The organic acids are all commercially available materials, "$C_7C_{20}$" acid comprises a mixture of predominantly secondary branched-chain carboxylic acids having from 7 to 20 carbon atoms per molecule. The naphthenic acids are secondary carboxylic acids derived from tetralin, having molecular weights of approximately 180 and 230 respectively. The versatic acids are commercially available mixtures of tertiary branched chain carboxylic acids having from 9 to 11, and from 15 to 19, carbon atoms per molecule respectively. Shellsol is a commercially available material containing mainly a mixture of trimethyl benzenes.

These results clearly demonstrate that versatic acid 911, which is a tertiary branched chain carboxylic acid, gives the widest possible spread in the values of the separation factor. We have found that a given acid is only efficient if it (a) Is either largely insoluble in water (where water is to be the other solvent), or resides almost totally in the organic solvent under these working conditions (this sets a lower limit on the number of carbon atoms in the molecule, and it is preferred to use an acid having at least 8 carbon atoms per molecule), (b) Is capable of giving a suitably concentrated solution of rare earth ions in the organic solvent without causing a large increase in viscosity (this effect becomes important above about 20 carbon atoms in the molecule). A single acid, or a mixture of acids, is equally effective.

The list of separation factors shows that the tertiary carboxylic acid "Versatic acid 911" separates samarium partially, and gives very little separation from gadolinium. Terbium (not listed) falls between gadolinium and dyspresium and also is not separated, whilst dysprosium and all the others are separated from yttrium. On the other hand, the tributyl phosphate process shows that the separation obtainable is markedly concentration variable, with two exceptions: yttrium is substantially unaffected, and erbium also stays close to yttrium.

Therefore by combining together the tributyl phosphate aqueous nitrates system and one of the organic carboxylic acid systems, separation of yttrium from the rare earths normally associated with it can be achieved.

In particular, by combining together a system using a branched chain carboxylic acid, and the tributyl and phosphate-aqueous nitrates system at a suitable concentration, complete separation of yttrium from the rare earths normally associated with it can be achieved. Preferentially, the two stages are employed in this order, but the reverse sequence is equally effective.

The concentration of the solutes in the aqueous phase of the tributyl phosphate/aqueous stage of the process depends in part on the purity of the yttrium desired. The applicants obtain 99.999% pure yttrium using a solute concentration in the aqueous phase of 100 g./l. Clearly, lower solute concentrations could result in yttrium of as good or better purity, but a limit on the dilution is set by the need to produce the yttrium in reasonable quantities. In general, the applicants prefer a solute concentration in the aqueous phase of not more than 120 g./l. when 99.999% pure yttrium is desired. When the yttrium need only be of 99.99% purity, higher solute concentrations of up to, for example, 160 g./l. or even higher may be employed.

Alternatively, a two-stage process of a combination of two different carboxylic acid systems can be used to separate yttrium from the rare earths normally associated in nature with it.

It is believed that tertiary branched-chain carboxylic acids have not previously been employed in liquid/liquid extraction systems. Their advantages, particularly the very wide spread of relative separation factors found for rare earths in them, are clearly shown in the preceding description.

Accordingly, the present invention provides a batch method for separating a rare earth (which term is to be understood for the purposes of this paragraph as including yttrium) from an initial mixture of rare earths, which method comprises: dissolving the initial mixture in at least one solvent of two at least partially immiscible solvents: processing the resulting solution or solutions in counter-current in a multi-stage liquid-liquid extraction system, and returning any solutes leaving each end of the said multi-stage counter-current liquid-liquid extraction system to that end of the system from which they are derived; continuing this processing until a sufficient separation has been achieved; stopping the flow of both of the countercurrently flowing solvents; and recovering the desired rare earth from the one or more units of the multi-stage extraction system which contain it in the desired purity; characterised in that one of the solvents is a tertiary branched chain carboxylic acid. The tertiary branched chain carboxylic acid has preferably from 8 to 20 carbon atoms per molecule, and may conveniently be employed in solution in a hydrocarbon, for example, the commercial mixture of trimethyl benzenes sold under the trade name Shellsol A, The rare earth element to be separated is preferably yttrium.

The following examples illustrate the invention.

EXAMPLE 1.—PREPARATION OF AN YTTRIUM CONCENTRATE

Solutions were prepared by the methods given below, from an oxide mixture of the following composition:

| Oxide: | Percent |
| --- | --- |
| $Y_2O_3$ | 43.3 |
| $Sm_2O_3$ | 0.7 |
| $Gd_2O_3$ | 6.7 |
| $Dy_2O_3$ | 12.7 |
| $Ho_2O_3$ | 2.0 |
| $Er_2O_3$ | 7.1 |
| $Yb_2O_3$ | 2.5 |

To 1500 gm. of this mixture was added 200 gm. of mixed $Pr_6O_{11}$ and $Nd_2O_3$ in order to provide a mixture more closely approximating commercial raw material.

(a) Organic phase: An equal volumes mixture of Versatic Acid 911 and Shellsol A was contacted with a concentrated solution of the mixture of oxides dissolved in aqueous nitric acid, and transfer of the metal ions to the organic phase obtained by adding .880 ammonium hydroxide solution. Contacting was continued until the organic phase contained equivalent of 40 gm./litre of dissolved oxides.

(b) Aqueous phase: A solution of 250 gm./litre of oxides in 5.3 molar nitric acid in water was made up.

The mixer-settlers used hold about 300 ml.; for the 25 stage unit used about 1,500 gm. of oxides was required. After filling, flows of 52 ml./min. of organic phase, and 12 ml./min. of aqueous phase were set up, and the extractor operated at total reflux for 22 hours. Analysis of the stages (aqueous phase only given; organic phase differs only by the relevant partition coefficient) gave the following results.

| Unit No. | Analysis, percent as oxides | | | | | | | | |
| --- | --- | --- | --- | --- | --- | --- | --- | --- | --- |
|  | Pr | Nd | Sm | Gd | Y | Dy | Ho | Er | Yb |
| 1 | 31.8 | 64.3 | | | | | | | |
| 4 | 17.3 | 75.7 | 1.2 | 4.8 | | | | | |
| 6 | 7.6 | 58.1 | 3.5 | 25.9 | 9.8 | | | | |
| 7 | 4.0 | 33.6 | 3.9 | 32.4 | 25.6 | | | | |
| 10 | 0.2 | 2.4 | 1.5 | 17.4 | 75.0 | 3.3 | | | |
| 13 | | 0.2 | 0.3 | 4.3 | 86.0 | 8.5 | 0.7 | 0.1 | |
| 16 | | | | 1.0 | 79.5 | 16.8 | 1.7 | 0.9 | |
| 19 | | | | | 63.1 | 25.6 | 4.0 | 5.2 | |
| 22 | | | | | 38.2 | 29.0 | 6.6 | 18.3 | 7.8 |
| 25 | | | | | 29.2 | 23.2 | 6.9 | 23.7 | 17.0 |

Maximum purity of yttrium reached is 86.0 in stage 13.

These data represent internal ratios; since yttrium is of a lower molecular weight, whilst solution molarity is preserved in all of the stages (excepting the end 2 or 3 which are perturbed by the reflux processes), variations in solution strength in gm./litre do occur, the loading being a minimum at maximum yttrium content.

The important impurities are neodymium and erbium; this 25 stage unit does not provide a sufficiently pure concentrate.

EXAMPLE 2.—PREPARATION OF A USEABLE YTTRIUM CONCENTRATE

The above experiment was repeated, using a mixture of primarily neodymium, samarium, dysprosium, erbium, holmium, yttrium and gadolinium oxides. The aqueous solution of nitrates was made up to 1.33 molar, as $Re(NO_3)_3$. When equilibrium had been reached, analysis of the stages gave the following results (aqueous phase only given), for the 50 stage unit used.

| Unit No. | Analysis, percent as oxides | | | | | | |
| --- | --- | --- | --- | --- | --- | --- | --- |
|  | Nd | Sm | Gd | Y | Dy | Ho | Er [1] |
| 1 | Perturbed due to reflux | | | | | | |
| 4 | 32.3 | 33.9 | 33.8 | ca. 0.1 | | | |
| 7 | 4.4 | 37.2 | 57.5 | 0.9 | | | |
| 10 | 0.4 | 27.5 | 65.9 | 6.2 | | | |
| 13 | | 13.8 | 51.8 | 34.3 | 0.1 | | |
| 16 | | 3.2 | 18.9 | 77.5 | 0.3 | | |
| 19 | | 0.4 | 3.4 | 95.3 | 1.0 | | |
| 22 | | | 0.6 | 97.5 | 1.8 | | |
| 25 | | | 0.1 | 96.6 | 3.2 | 0.1 | |
| 28 | | | | 94.8 | 5.1 | 0.1 | |
| 31 | | | | 91.5 | 8.2 | 0.3 | |
| 34 | | | | 87.0 | 12.4 | 0.5 | |
| 37 | | | | 78.9 | 19.9 | 1.2 | ca. 0.1 |
| 40 | | | | 65.8 | 31.3 | 2.6 | 0.3 |
| 43 | | | | 45.7 | 46.4 | 5.8 | 2.1 |
| 45 | | | | 30.6 | 53.4 | 9.8 | 7.2 |
| 47 | | | | 16.8 | 51.8 | 11.4 | 20.1 |
| 50 | | | | 4.1 | 30.5 | 10.2 | 55.2 |

[1] Contains other earths up to $Lu_2O_3$ inclusive.

Thus units 11–36 contain yttrium at a purity suitable for the second stage of the process.

EXAMPLE 3.—PURIFICATION OF AN YTTRIUM CONCENTRATE

After suitable chemical treatment to provide the concentrate as nitrates, the following solutions were made up:

(a) Organic phase: tributyl phosphate, diluted with an equal volume of Shellsol A, containing 21 gm./litre of solutes, expressed as oxides (approximately 40 gm./litre as nitrates, depending on the precise yttrium content).

(b) Aqueous phase: aqueous solution of nitrates, containing 100 gm./litre as oxides (approximately 200 gm./litre of nitrates, depending on the precise yttrium content).

(Note: it is not possible to give precise nitrate figures; the concentrate is recovered from stage 1 as the oxides—thus these solutions are prepared by dissolving this in the minimum of nitric acid; the final solutions contain no free nitric acid.)

This mixture was then charged into a 50 unit extractor system, and extraction at total reflux carried out; reflux was obtained by:

Aqueous solution: concentration to 380 gm./litre $Y(NO_3)_3$.

Organic solution: extraction with a large volume of water, and concentration of this solution to 190 gm./litre $Re(NO_3)_3$.

The flow rates used were 10 ml./min. of the organic phase and 4.6 ml./min. of the aqueous phase.

At equilibrium, analysis of the aqueous phases in the units gave the following results:

| Unit No. | $Y_2O_3$ | $Er_2O_3$ | Others |
|---|---|---|---|
| 1 | >99.99 | Nil | Nil |
| 25 | >99.99 | Nil | Nil |
| 30 | >99.98 | 0.01 | 0.01 |
| 35 | >99.95 | 0.01 | 0.04 |
| 40 | >99.88 | 0.01 | 0.11 |
| 45 | >99.35 | 0.02 | 0.63 |
| 48 | >96.4 | 0.03 | 3.57 |
| 50 | >87.8 | 0.05 | 12.15 |

Typical analysis of the rare-earth mixture present with the yttrium in the refluxed solutes are follows—

| Element: | Content, percent (relative) |
|---|---|
| Pr | <1.0 |
| Nd | <1.0 |
| Sm | 10.0 |
| Eu | 1.1 |
| Gd | 13.3 |
| Tb | 14.9 |
| Dy | 7.6 |
| Ho | ca. 0.4 |
| Er | 0.2 |
| Y | ca. 51.0 |

We claim:

1. A batch method for the separation of a solution containing highly pure yttrium from an initial mixture containing yttrium and rare-earths which method comprises in one step (a) providing a first pair of two at least partially immiscible solutions; passing these solutions in counter-current flow contact in a multiple-stage liquid-liquid extraction system, and returning all solutes leaving each end of the said multi-stage counter-current liquid-liquid extraction system to that end of the system from which they left; continuing the counter-current flow contact until a sufficient separation and concentration of the yttrium from the rare earths occurs in at least some of the stages in said multi-stage system; (b) stopping the flow of both of the counter-currently flowing solutions; emptying those stages of the multi-stage extraction system wherein said substantial separation and concentration of yttrium has occurred to provide an yttrium concentrate; recovering this concentrate and in another step providing a second pair of two at least partially immiscible solutions including said yttrium concentrate, at least one of said solutions being different from the first pair; (c) passing said second pair of solutions in counter-current flow contact in a multi-stage liquid-liquid extraction system, and returning all solutes leaving each end of the said second multi-stage counter-current liquid-liquid extraction system to that end of the system from which they left; continuing this counter-current flow contact until a sufficient separation has again been achieved; (d) stopping the flow of both of the counter-currently flowing solvents; and emptying those units containing a solution of suitably pure yttrium, one of said pairs of solutions comparing (1) an aqueous hydrochloric or nitric acid solution of rare earth and yttrium ions, and (2) a solution of rare earth and yttrium ions and a branched chain carboxylic acid having from 8–20 carbon atoms per molecule, the other of said pairs of solutions comprising (3) a solution of nitrates of yttrium and rare earths in tributyl phosphate, and (4) an aqueous solution of nitrates of yttrium and rare earths.

2. A method as claimed in claim 1, wherein the branched-chain carboxylic acid is employed in solution in an inert hydrocarbon solvent.

3. A method as claimed in claim 1, wherein the tributyl phosphate is employed in solution in an inert hydrocarbon solvent.

4. A method as claimed in claim 1, wherein the concentration of yttrium and rare-earths, as oxides, in said aqueous solution of nitrates is not more than 160 g./l.

5. A method as claimed in claim 4, wherein the concentration of the yttrium and rare-earths, as oxides, in said aqueous solution of nitrates is from 80 to 120 g./l.

6. A batch method for the separation of yttrium or a rare-earth from an initial mixture selected from yttrium and rare-earths, which method comprises: (a) providing a pair of two at least partially immiscible solutions; passing these solutions in counter-current flow contact in a multi-stage liquid-liquid extraction system and returning all solutes leaving each end of the said multi-stage counter-current liquid-liquid extraction system to that end of the system from which they left; continuing the counter-current flow contact until a sufficient separation and concentration of said rare earth occurs in at least some of the stages in said multi-stage system; (b) stopping the flow of both of the counter-currently flowing solutions; emptying those stages of the multi-stage extraction system wherein said substantial separation and concentration of said rare earth has occurred to provide a concentrate of said rare earth; said pair of solutions comprising (1) an aqueous hydrochloric or nitric acid solution of rare earth ions, and (2) a solution of rare earth ions and a tertiary branched chain carboxylic acid having from 8–20 carbon atoms per molecule.

7. A method as claimed in claim 6, wherein the tertiary carboxylic acid is employed in solution in an inert hydrocarbon solvent.

8. A method as claimed in claim 6, wherein the rare-earth to be separated is yttrium.

References Cited

UNITED STATES PATENTS

| | | | |
|---|---|---|---|
| 2,798,789 | 7/1957 | Spedding | 23—19 |
| 2,955,913 | 10/1960 | Peppard | 23—19 X |
| 3,251,646 | 5/1966 | Alon | 23—312 X |
| 3,323,857 | 6/1967 | Bauer | 23—23 |

(Other references on following page)

UNITED STATES PATENTS

| | | | |
|---|---|---|---|
| 3,328,116 | 6/1967 | Grinstead | 23—23 |
| 3,387,944 | 6/1968 | Sherrington et al. | 23—310 |

FOREIGN PATENTS 1,382,467   1/1964   France.

OTHER REFERENCES

Weaver, ORNL-2863, February, 1960, pp. 1–19.

Peterson, A–I., CA. E. Journal, March 1956, vol. 2, No. 1, pp. 38–41.

Fletcher, Bull. of Inst. of Mining & Metallurgy, vol. 70, No. 652, March, 1961, pp. 355 to 359, 365 and 366.

NORMAN YUDKOFF, Primary Examiner

S. J. EMERY, Assistant Examiner

U.S. Cl. X.R.

23—19, 23